US012362116B2

(12) United States Patent
Bruni et al.

(10) Patent No.: US 12,362,116 B2
(45) Date of Patent: Jul. 15, 2025

(54) METHOD FOR ASSEMBLING A SWITCHING APPARATUS FOR MEDIUM VOLTAGE ELECTRIC SYSTEMS

(71) Applicant: ABB Schweiz AG, Baden (CH)

(72) Inventors: Jacopo Bruni, Caselle Lurani (IT); Giorgio Forlani, Romano di Lombardia (IT); Gianluca Cortinovis, Albino (IT); Emanuele Morelli, Azzano San Paolo (IT)

(73) Assignee: ABB Schweiz AG, Baden (CH)

( * ) Notice: Subject to any disclaimer, the term of this patent is extended or adjusted under 35 U.S.C. 154(b) by 204 days.

(21) Appl. No.: 18/311,945

(22) Filed: May 4, 2023

(65) Prior Publication Data

US 2023/0368994 A1 Nov. 16, 2023

(30) Foreign Application Priority Data

May 12, 2022 (EP) .................................... 22173041

(51) Int. Cl.
*H01H 33/666* (2006.01)
*H01H 33/664* (2006.01)

(52) U.S. Cl.
CPC ...... *H01H 33/6661* (2013.01); *H01H 33/664* (2013.01); *H01H 33/6664* (2013.01)

(58) Field of Classification Search
CPC ............. H01H 33/6661; H01H 33/664; H01H 33/6664; H01H 33/122; H01H 33/121;
(Continued)

(56) References Cited

U.S. PATENT DOCUMENTS

| | | | | |
|---|---|---|---|---|
| 3,824,359 A * | 7/1974 | Date | .................... | H01H 33/127 218/10 |
| 5,644,117 A * | 7/1997 | Bolongeat-Mobleu | ..................... | H01H 33/122 218/154 |

(Continued)

FOREIGN PATENT DOCUMENTS

| | | |
|---|---|---|
| EP | 1416503 A2 | 5/2004 |
| EP | 1939909 A2 | 7/2008 |

(Continued)

OTHER PUBLICATIONS

Translation of EP 0693763 (Original document published Jan. 24, 1996). (Year: 1996).*

(Continued)

*Primary Examiner* — William A Bolton
(74) *Attorney, Agent, or Firm* — McCarter & English, LLP

(57) ABSTRACT

A method for assembling a switching apparatus for medium voltage electric systems is provided. The method includes, for each electric pole of the switching apparatus, providing a mounting assembly. The mounting assembly includes a support structure, a vacuum interrupter, a motion transmission mechanism, and an auxiliary contact. The method further includes providing a first semi-finished structure of the switching apparatus, where the first semi-finished structure includes, for each electric pole of the switching apparatus, a first pole terminal and a first fixed contact electrically connected to the first pole terminal. The method further includes, for each electric pole of the switching apparatus, installing the mounting assembly on the first semi-finished structure.

15 Claims, 7 Drawing Sheets

Figure 1:
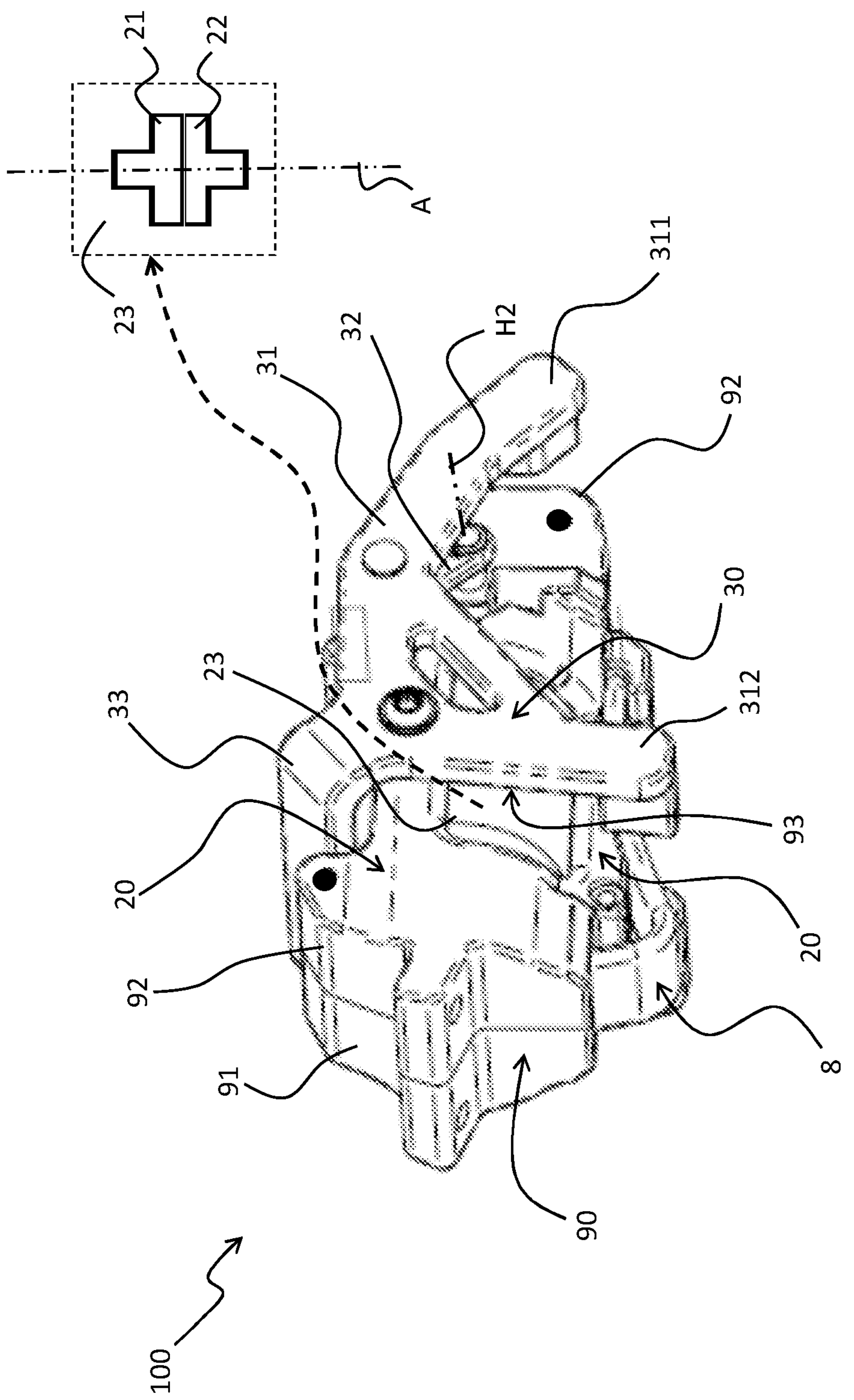

(58) Field of Classification Search
CPC ........... H01H 33/126; H01H 33/66207; H01H 33/666; H01H 2033/566; H01H 31/003; H01H 31/16; H02B 3/00
USPC ........ 218/140, 139, 138, 134, 120, 118, 126
See application file for complete search history.

(56) References Cited

U.S. PATENT DOCUMENTS

| | | | | |
|---|---|---|---|---|
| 6,624,996 | B2 * | 9/2003 | Theaudiere | H01H 9/104<br>361/104 |
| 8,581,135 | B2 * | 11/2013 | Piccoz | H01H 33/126<br>218/120 |
| 8,729,416 | B2 * | 5/2014 | Bullock | H01H 33/6662<br>218/118 |
| 9,251,972 | B2 * | 2/2016 | Belloni | H01H 9/02 |
| 9,679,724 | B2 * | 6/2017 | Abrahamsen | H01H 33/128 |
| 10,217,581 | B2 | 2/2019 | Famy | |
| 2022/0013312 | A1 * | 1/2022 | Deshmukh | H01H 33/122 |
| 2023/0230785 | A1 * | 7/2023 | Hyrenbach | H01H 33/143<br>218/118 |

FOREIGN PATENT DOCUMENTS

| | | | | | |
|---|---|---|---|---|---|
| EP | 2182536 | A1 | | 5/2010 | |
| FR | 682807 | A | | 6/1930 | |
| FR | 0693763 | | * | 1/1996 | H01H 33/122 |
| FR | 2722912 | A1 | | 1/1996 | |
| GB | 1126362 | A | | 9/1968 | |
| GB | 1156919 | A | | 7/1969 | |
| JP | 2011-233374 | A | | 11/2011 | |
| WO | 2006074975 | A1 | | 7/2006 | |

OTHER PUBLICATIONS

Korean Office Action for Application No. 10-2023-0058120, dated Nov. 8, 2024, 8 pages.

Extended European Search Report for European Application No. 22173041.9, dated Nov. 14, 2022, 6 pages.

European Search Report for European Application No. EP09174001, dated Jan. 28, 2010, 3 pages.

* cited by examiner

METHOD FOR ASSEMBLING A SWITCHING APPARATUS FOR MEDIUM VOLTAGE ELECTRIC SYSTEMS

CROSS-REFERENCE TO RELATED APPLICATION

This application claims priority to European Patent Application No. 22173041.9, filed May 12, 2022, and titled "A METHOD FOR ASSEMBLING A SWITCHING APPARATUS FOR MEDIUM VOLTAGE ELECTRIC SYSTEMS", which is hereby incorporated by reference in its entirety.

BACKGROUND

The present disclosure relates to a method for assembling a switching apparatus for medium voltage electric systems, more particularly a load-break switch for medium voltage electric systems.

Load-break switches are well known in the state of the art.

These switching apparatuses, which are generally used in secondary distribution electric grids, are capable of providing circuit-breaking functionalities (namely breaking and making a current) under specified circuit conditions (typically nominal or overload conditions) as well as providing circuit-disconnecting functionalities (namely grounding a load-side section of an electric circuit).

Most recent load-break switches available on the market employ rather complicated arrangements of the electric poles, which are basically designed to ensure the above-mentioned functionalities together with a satisfactory dielectric insulation between the live parts and, at the same time, avoid the use of insulation gases with high GWP (Global Warming Potential) values (for example $SF_6$).

Typically, these switching apparatuses include, for each electric pole, a main contact system and a shunt vacuum interrupter.

The main contact system has electric contacts operating in an atmosphere filled with an environment-friendly insulating gas or air and is designed for carrying most of the current flowing along the electric pole as well as driving possible switching maneuvers.

The shunt vacuum interrupter has electric contacts operating in a vacuum atmosphere and it is specifically designed for quenching the electric arcs arising when the current flowing along the electric pole is interrupted. The operation of the vacuum interrupter is basically driven by the movable contact of the main contact system. To this aim, for each electric pole, a motion transmission mechanism is arranged to coordinate the operation of the vacuum interrupter with the movements of the movable contact of the main contact system, during possible switching maneuvers.

The above-mentioned switching apparatuses have proven to ensure a relatively low environmental impact and, at the same time, high-level performances in terms of dielectric insulation and arc-quenching capabilities. However, until now, their production at industrial level is still time consuming and relatively expensive.

As a mailer of fact, for these switching apparatuses, a high number of electrical and mechanical components have to be assembled one by one to obtain a finished product, Additionally, following their installation, the components of these switching apparatuses often need to be subject to hardworking calibration sessions to correct possible misalignments or other mounting defects.

In the state of the art, it is quite felt the need for innovative solutions for assembling these switching apparatuses, which are capable of overcoming or mitigating the above-mentioned criticalities.

BRIEF DESCRIPTION

In order to respond to this need, the present disclosure provides a method for assembling a switching apparatus, according to the following claim 1 and the related dependent claims.

In a general definition, the assembling method of the present disclosure includes the following steps:

for each electric pole of said switching apparatus, providing a mounting assembly, said mounting assembly including:

a support structure made of electrically insulating material;

a vacuum interrupter including a first arc contact, a second arc contact and a vacuum chamber, in which said first and second arc contacts are at least partially enclosed and can be coupled or decoupled;

a motion transmission mechanism mechanically coupled to a movable arc contact between said first and second arc contacts and including at least a lever member made of electrically insulating material pivoted on said support structure;

an auxiliary contact mechanically fixed to said support structure and electrically connected to the first arc contact of said vacuum interrupter providing a first semi-finished structure of said switching apparatus, wherein said first semi-finished structure includes, for each electric pole of said switching apparatus, at least a first pole terminal and a first fixed contact electrically connected to said first pole terminal;

for each electric pole of said switching apparatus, installing said mounting assembly on said first semi-finished structure, wherein the installation of said mounting assembly includes:

mechanically fixing said support structure to one or more support components of said first semi-finished structure; and electrically connecting the second arc contact of said vacuum interrupter to the first fixed contact of said first semi-finished structure.

According to some embodiments of the present disclosure, for each electric pole of said switching apparatus, said support structure is mechanically fixed to a first housing shell of said first semi-finished structure and to said first fixed contact.

According to other embodiments of the present disclosure, for each electric pole of said switching apparatus, said support structure is mechanically fixed to a supporting bracket of said first semi-finished structure and to said first fixed contact.

Said support structure may be configured to define a seat, in which said vacuum chamber is accommodated.

Said support structure may include a first half-portion and a second half-portion mechanically fixed one to another.

Said motion transmission mechanism may include at least a first lever member pivoted on said support structure at a first hinge axis and at least second lever member pivoted on a movable arc contact between said first and second arc contacts at a second hinge axis. Each first lever member and each corresponding second lever member are pivoted one on another at a third hinge axis.

According to some embodiments of the present disclosure, said first arc contact is a fixed arc contact while said second arc contact is a movable arc contact.

According to other embodiments of the present disclosure, said first arc contact is a movable arc contact while said second arc contact is a fixed arc contact.

The assembly method of the present disclosure may include the step of providing a second semi-finished structure of said switching apparatus, wherein said second semi-finished structure includes, for each electric pole of said switching apparatus, a second pole terminal and a second fixed contact electrically connected to said second pole terminal.

Said first semi-finished structure or said second semi-finished structure may include a ground terminal and a third fixed contact electrically connected to said ground terminal.

The assembly method of the present disclosure may include the step of providing a third semi-finished structure of said switching apparatus. Said third semi-finished structure includes, for each electric pole of said switching apparatus, a movable contact reversibly movable about a rotation axis according to opposite first and second rotation directions. Said third semi-finished structure further includes a driving shaft mechanically coupled to each movable contact.

The assembly method of the present disclosure may include the step of assembling said second and third semi-finished structures with a group formed by said first semi-finished structure and said mounting assembly.

In a further aspect, the present disclosure relates to a mounting assembly, according to the following claim 13.

The mounting assembly includes:

- a support structure made of electrically insulating material;
- a vacuum interrupter including a first arc contact, a second arc contact and a vacuum chamber, in which said first and second arc contacts are at least partially enclosed and can be coupled or decoupled;
- a motion transmission mechanism mechanically coupled to a movable arc contact between said first and second arc contacts and including at least a lever member made of electrically insulating material pivoted on said support structure; and
- an auxiliary contact mechanically fixed to said support structure and electrically connected to the first arc contact of said vacuum interrupter.

The mounting assembly is configured to be installed on a first semi-finished structure of said switching apparatus.

Said support structure is configured to be mechanically fixed to one or more support components of said first semi-finished structure, when said mounting assembly is installed on said first semi-finished structure.

The second arc contact of said vacuum interrupter is configured to be electrically connected to a first fixed contact of said first semi-finished structure, when said mounting assembly is installed in said first semi-finished structure.

In yet another aspect, the present disclosure relates to a switching apparatus, according to the following claim 14 and the related dependent claims.

Further characteristics and advantages of the present disclosure will emerge from the description of embodiments, non-limiting examples of which are provided in the attached drawings.

DRAWINGS

Figure 2:
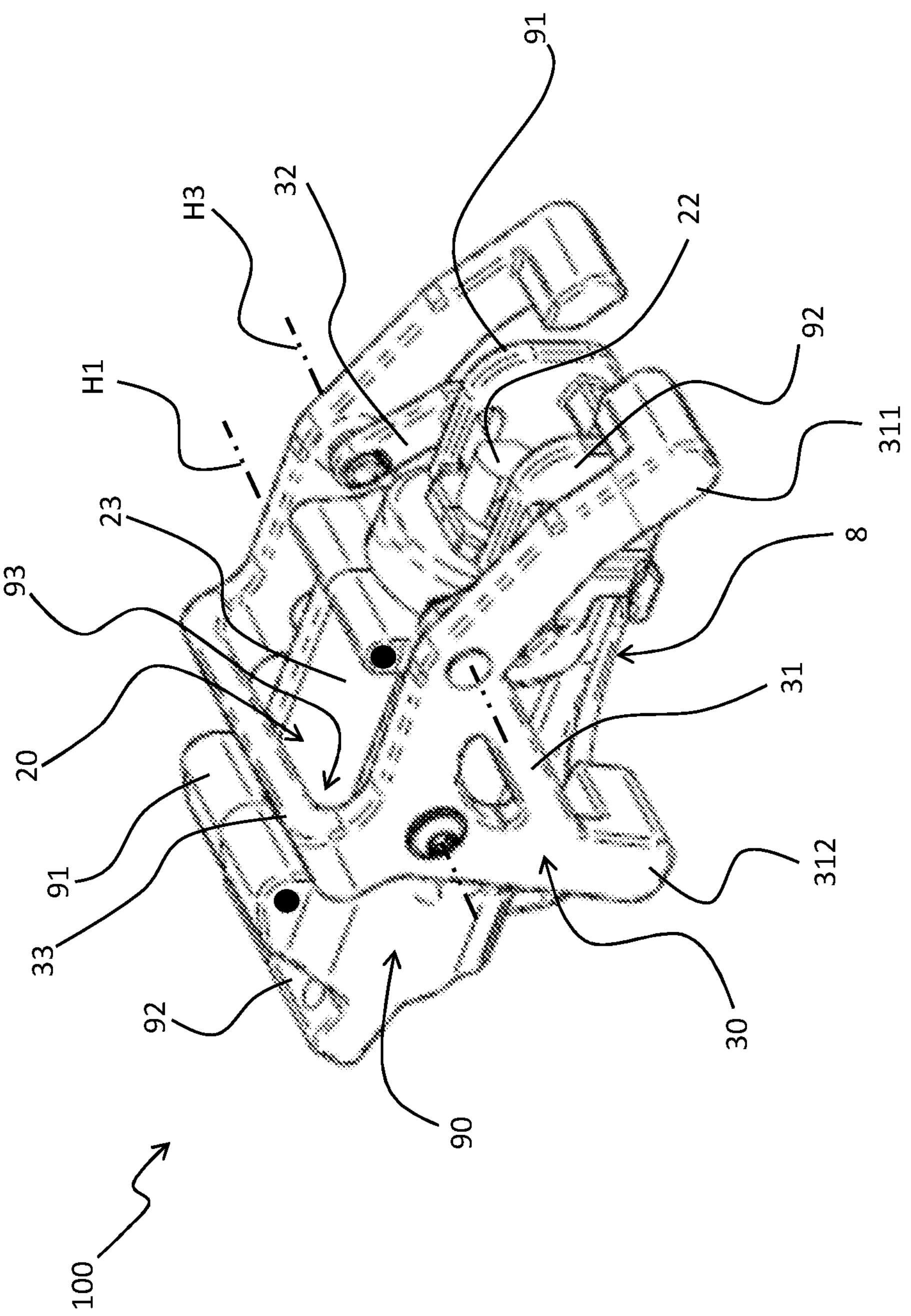
Figure 3:
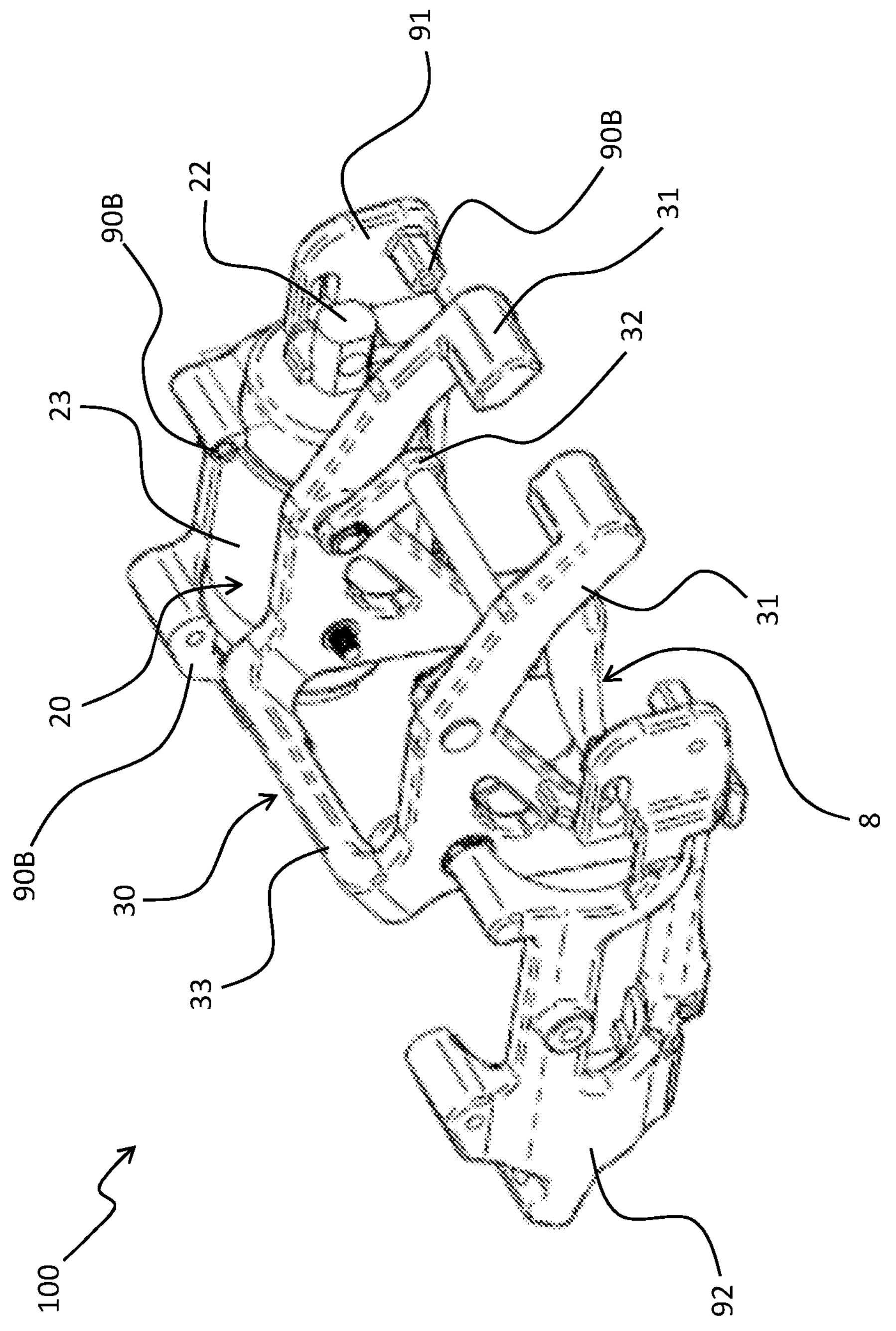

FIGS. 1-3 are schematic views partially showing a mounting assembly provided when carrying out the assembling method of the present disclosure.

Figure 4:
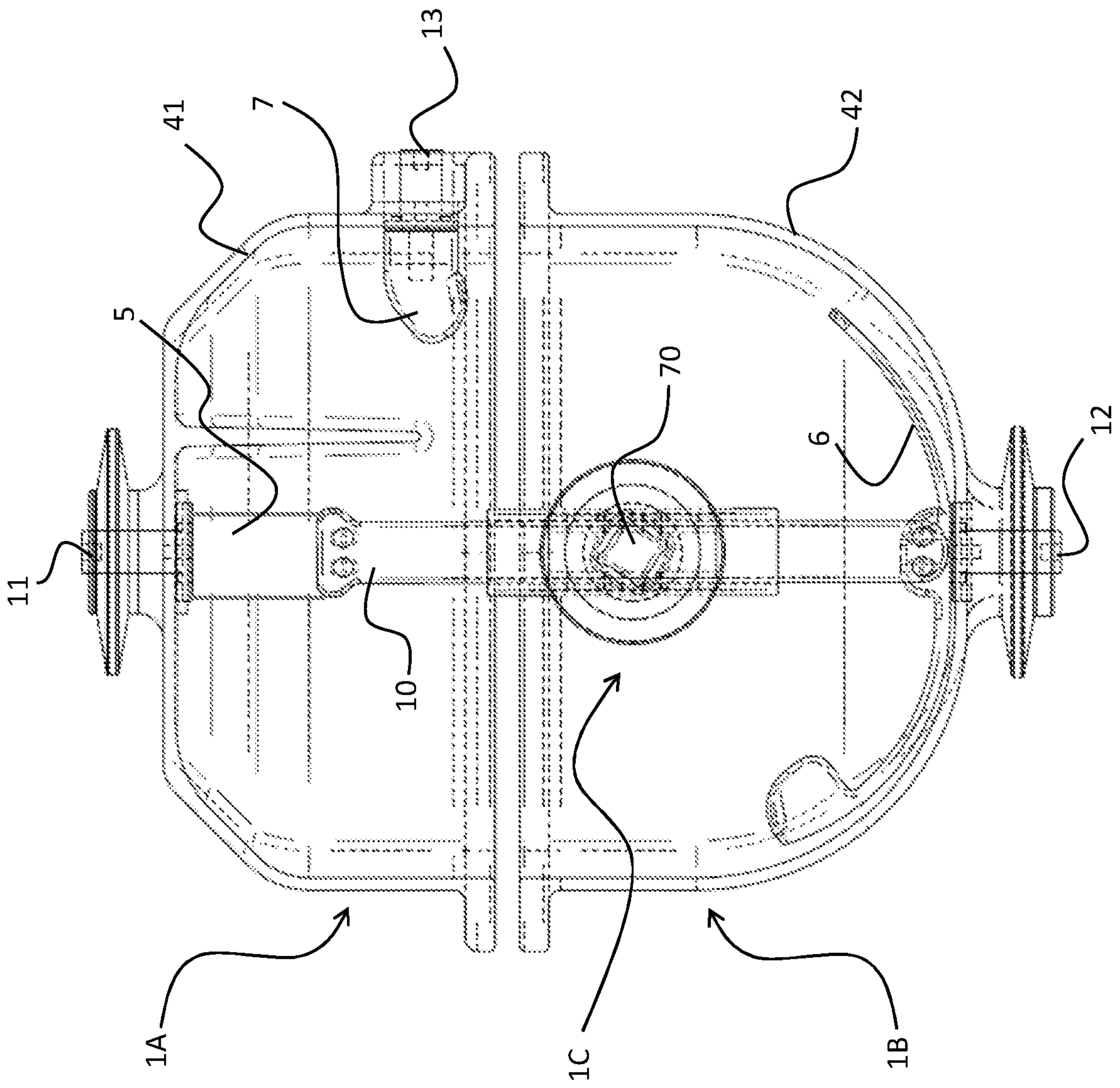

FIG. 4 schematically shows some semi-finished structures of the switching apparatus, provided when carrying out the assembling method of the present disclosure.

Figure 5:
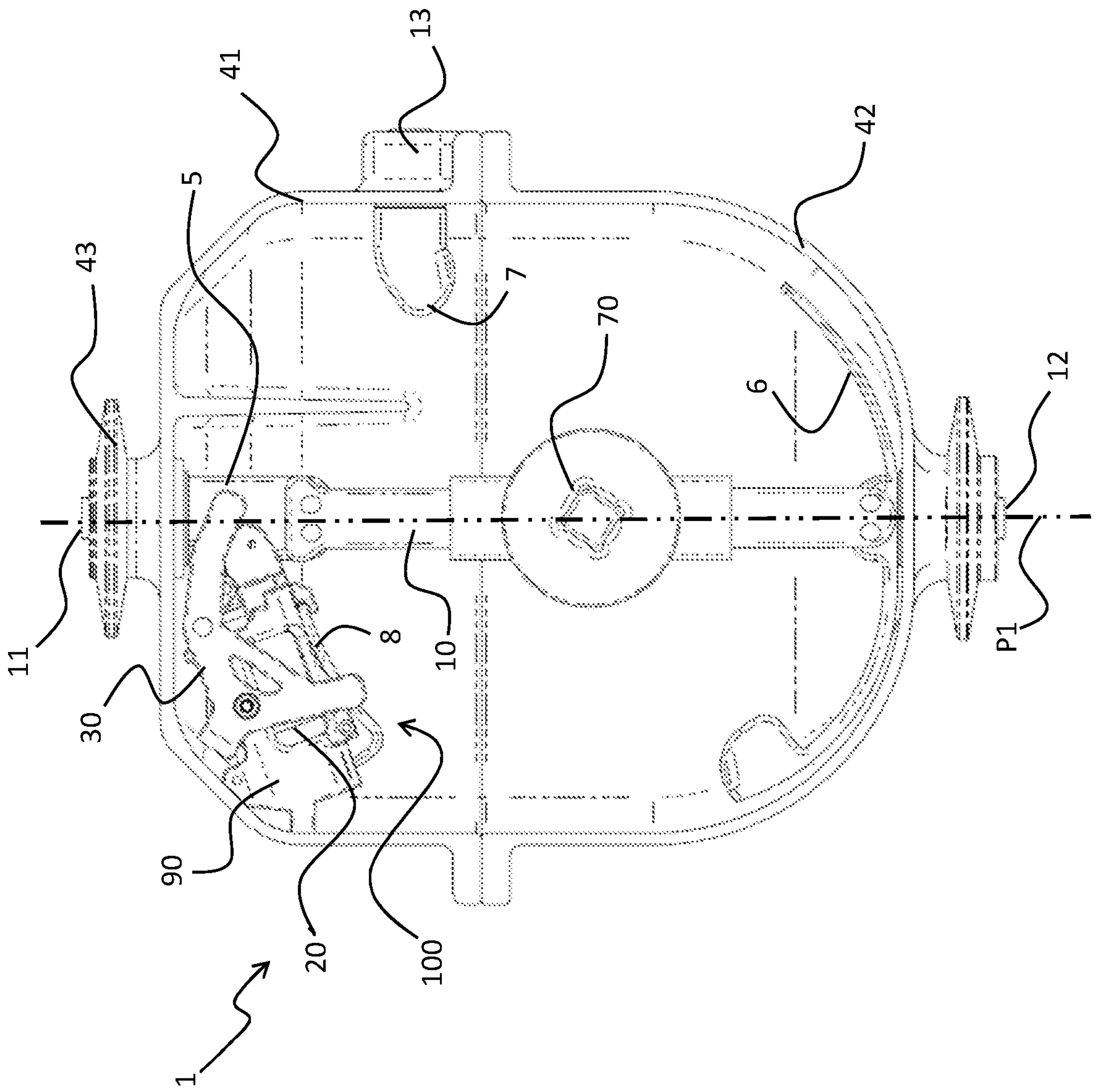
Figure 6:
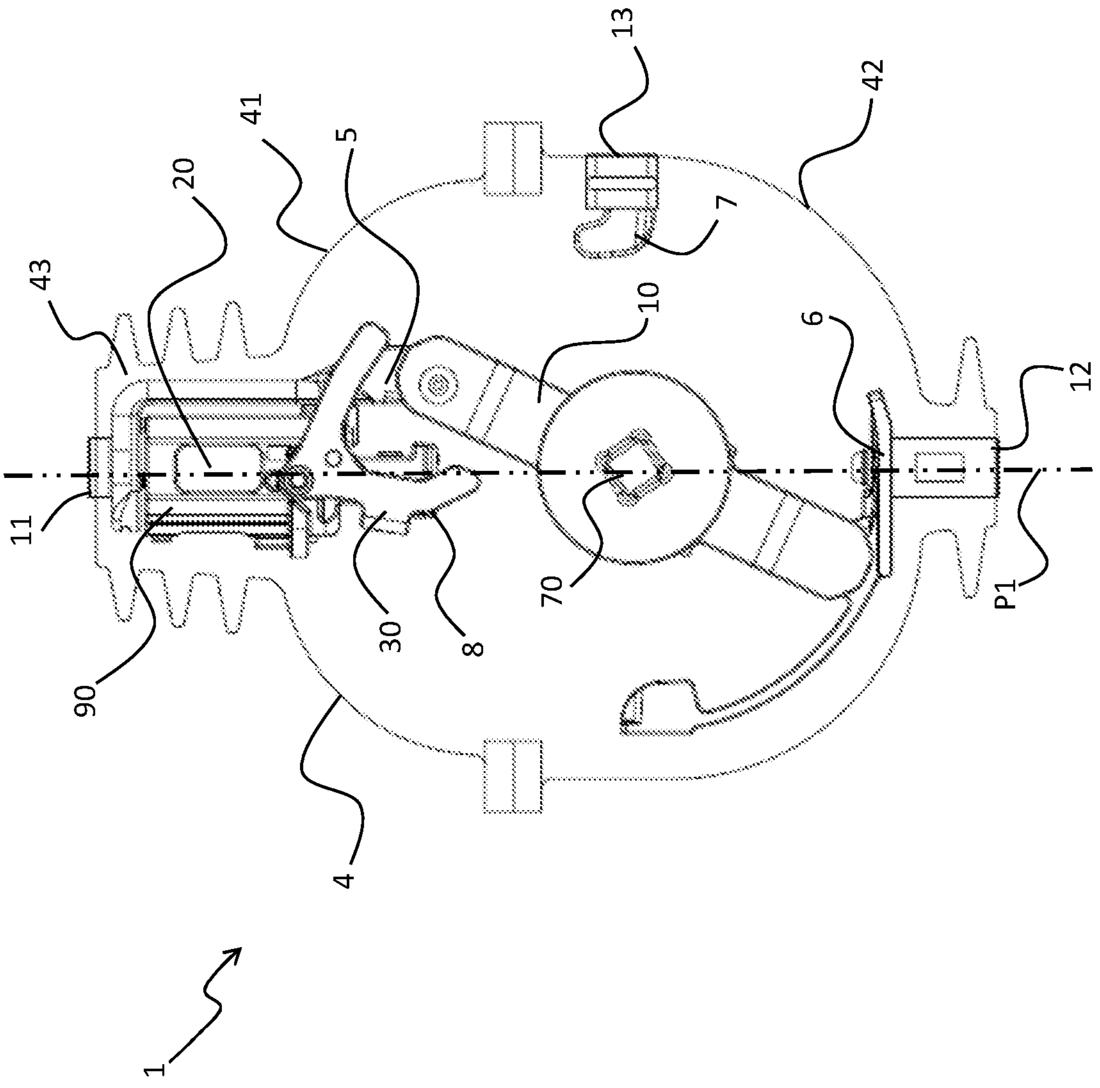
Figure 7:
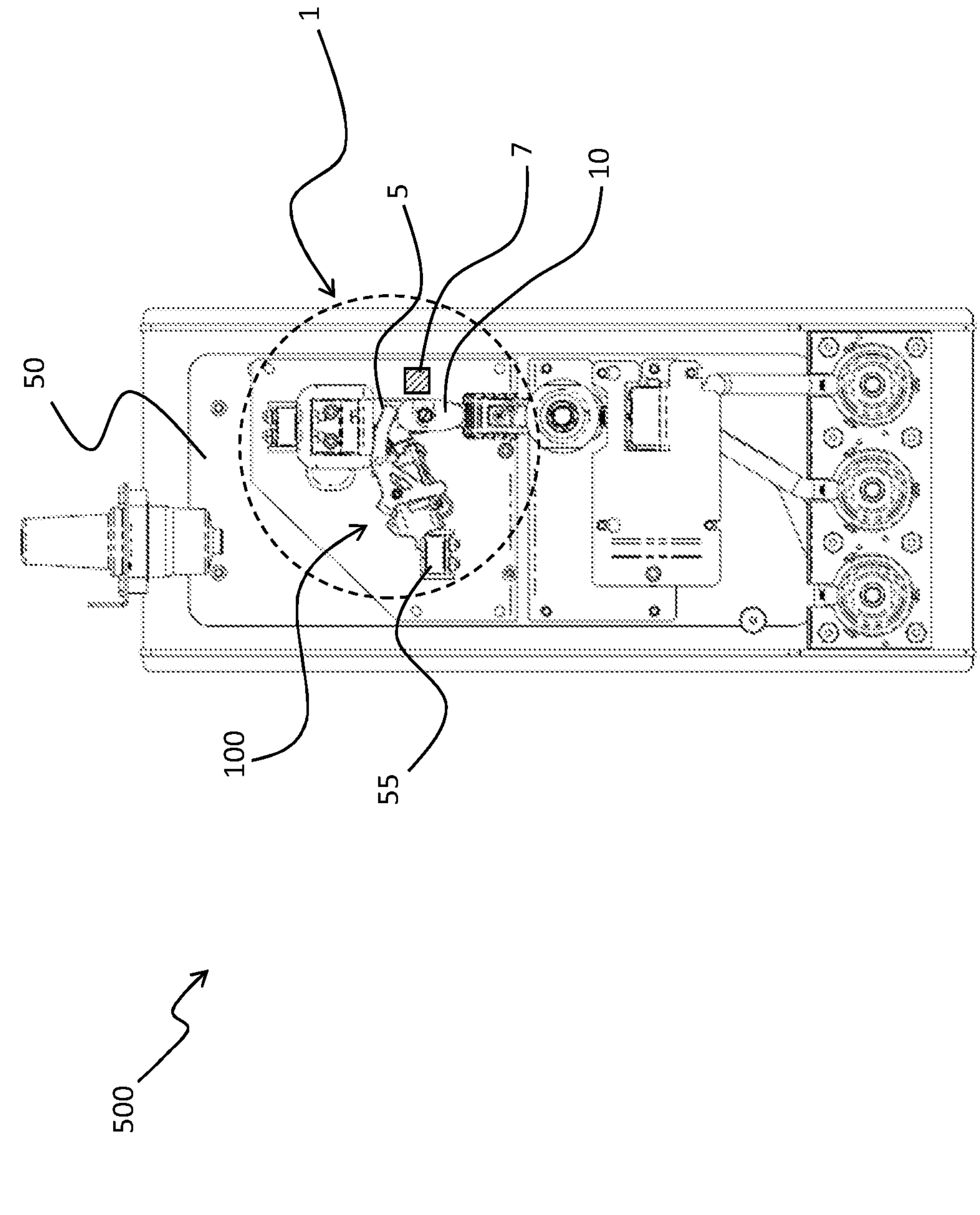

FIGS. 5-7 show some examples of switching apparatus assembled through the assembling method of the present disclosure.

DETAILED DESCRIPTION

With reference to the cited figures, the present disclosure relates to a method for assembling a switching apparatus 1 for medium voltage electric systems.

For the purposes of the present disclosure, the term "medium voltage" (MV) relates to operating voltages at electric power distribution level, which are higher than 1 kV AC and 1.5 kV DC up to some tens of kV, e.g., up to 72 kV AC and 100 kV DC.

For the purposes of the present disclosure, the terms "terminal" and "contact" should be hereinafter intended, unless otherwise specified, as "electric terminal" and "electric contact", respectively, thereby referring to electrical components suitably arranged to be electrically connected or coupled to other electrical conductors.

The switching apparatus 1 is particularly adapted to operate as a load-break switch. It is therefore designed for providing circuit-breaking functionalities under specified circuit conditions (nominal or overload conditions) as well as circuit-disconnecting functionalities, in particular grounding a load-side section of an electric circuit.

As it will better emerge from the following, the switching apparatus 1 may be of the "single-disconnection" type (not shown) or the "double-disconnection" type (FIGS. 4-7) depending on how the current path through each electric pole is interrupted when the switching apparatus reaches an open state. In the following, the assembling method of present disclosure will be described with particular reference to a switching apparatus of the "double-disconnection" type for the sake of brevity only and without intending to limit the scope of the present disclosure in any way.

The switching apparatus 1 includes one or more electric poles.

The switching apparatus 1 may be of the multi-phase (e.g., three-phase) type and it may include a plurality (e.g., three) of electric poles.

In general, the electric poles of the switching apparatus are immersed in a pressurized atmosphere including dry air or another insulating gas having a low environmental impact, such as a mixture of oxygen, nitrogen, carbon dioxide and/or a fluorinated gas.

According to some embodiments of the present disclosure (FIGS. 5-6), the switching apparatus 1 is assembled as a self-standing product. In this case, the switching apparatus 1 conveniently includes an insulating housing, which conveniently defines an internal volume where the electric poles are accommodated.

According to other embodiments of the present disclosure (FIG. 7), the switching apparatus 1 is assembled in a cubicle together with other electric devices. In this case, the switching apparatus may not include a dedicated housing to enclose its components.

The assembling method of the present disclosure includes a step of providing, for each electric pole of the switching apparatus, a mounting assembly 100 (FIGS. 1-3).

The mounting assembly 100 includes a support structure 90 made of electrically insulating material, for example a plastic material.

The support structure 90 may be configured to define a seat 93 for accommodating a further component of the mounting assembly, namely the vacuum chamber 23 of a vacuum interrupter 20, as it will better emerge from the following.

The support structure 90 may be shaped as an elongated cage shaped as a hollow cylindroid or a prismoid.

The support structure 90 may include a first half-portion 91 and a second half-portion 92 that are mechanically fixed one to another through suitable fixing means of known type, for example screws, rivets, shape-coupling or snap-fit arrangements (FIGS. 1-2).

The first and second half-portions 91, 92 may have complementary shapes and may be mutually coupled at suitable coupling surfaces 90B (FIG. 3).

The mounting assembly 100 further includes a vacuum interrupter 20 including a first arc contact 21, a second arc contact 22 and a vacuum chamber 23, in which a vacuum atmosphere is present (FIG. 1).

The first and second arc contacts 21, 22 are at least partially enclosed in the vacuum chamber 23, so that they have contact regions, which can mutually couple or decouple, while being immersed in a vacuum atmosphere.

The vacuum chamber 23 is mechanically fixed to the support structure 90. To this aim, the vacuum chamber 23 is accommodated in the dedicated seat 93 defined by the support structure 90.

The support structure 90 may be shaped in such a way to clasp the vacuum chamber 23 and hold it in position.

The vacuum chamber 23 may have a cylindrical or prismatic shape, which may be conveniently complementary to the shape of the seat 93 defined by the support structure 90.

The first and second arc contacts 21, 22 may be formed by elongated pieces of conductive material, and each elongated piece of conductive material may have one end protruding from the vacuum chamber 23 and an opposite free end forming a contact region intended to be coupled with or decoupled from a corresponding contact region of the other arc contact.

In principle, the first and second arc contacts 21, 22 and the vacuum chamber 23 may be realized according to other solutions of known type, which are here not described in detail for the sake of brevity.

In general, an arc contact between the aforesaid first and second arc contacts 21, 22 is a fixed arc contact while the other arc contact between said first and second arc contacts 21, 22 is a movable arc contact.

According to some embodiments of the present disclosure (shown in the cited figures), the first arc contact 21 is a fixed arc contact while the second arc contact 22 is a movable arc contact.

According to alternative embodiments of the present disclosure (not shown), the first arc contact 21 is a movable arc contact while the second arc contact 22 is a fixed arc contact.

The movable arc contact between said first and second arc contacts 21, 22 is reversibly movable about a translation axis A, (FIG. 1), which may be aligned with a main longitudinal axis of the vacuum chamber 23.

As it is reversibly movable about the displacement axis A, the movable arc contact between said first and second arc contacts can be coupled to or uncoupled from the fixed arc contact between said first and second arc contacts, thereby being electrically connected to or electrically disconnected from this latter.

According to possible variants of the present disclosure (not shown), the movable arc contact between said first and second arc contacts may be solidly coupled to a contact shaft, which is adapted to transmit motion to said movable arc contact and which may be made, at least partially, of an electrically insulating material.

According to further possible variants of the present disclosure (not shown), the above-mentioned contact shaft may be mechanically coupled to a compression spring coaxially arranged to exert a constant compression force, which is directed to press the movable arc contact towards the fixed arc contact, thereby opposing to any movement of the movable arc contact away from the fixed arc contact.

The mounting assembly 100 further includes a motion transmission mechanism 30 mechanically coupled to the movable arc contact between the aforesaid first and second arc contacts 21, 22.

According to some embodiments of the present disclosure (shown in the cited figures), the motion transmission mechanism 30 is mechanically coupled to the second arc contact 22 (i.e., to the movable arc contact).

According to alternative embodiments of the present disclosure (not shown), the motion transmission mechanism 30 is mechanically coupled to the first arc contact 21 (i.e., to the movable arc contact).

In general, the motion transmission mechanism is configured to be mechanically actuated by a movable contact 10 of the switching apparatus to cause a movement of the movable arc contact of the vacuum interrupter 20 along the above-mentioned translation axis A.

Advantageously, the motion transmission mechanism 30 includes one or more lever members pivoted on the support structure 10.

The motion transmission mechanism 30 may include at least a first lever member 31 pivoted on the support structure 90 at a first hinge axis H1 (FIG. 2) and at least a second lever member 32 pivoted on the movable arc contact of the vacuum interrupter at a second hinge axis H2 (FIG. 1). Each first lever member 31 and each corresponding second lever member 32 are pivoted one on another at a third hinge axis H3 (FIG. 2).

According to the embodiment shown in FIGS. 1-3, the motion transmission mechanism 30 includes a pair of first lever members 31, which are arranged in parallel at opposite sides of the vacuum chamber 23 and are pivoted on the support structure 90 at the first hinge axis H1.

As shown, each first lever member 31 may be formed by a body of electrically insulating material having a reversed-V shaped configuration, with first and second lever arms 311, 312 extending along different directions in such a way to be angularly spaced one from another.

Conveniently, the motion transmission mechanism 30 includes at least a reinforcement member 33 joining the first lever members 31.

According to the embodiment shown in FIGS. 1-3, the motion transmission mechanism 30 includes a pair of second lever members 32, which are arranged in parallel at opposite sides of the vacuum chamber 23 and are pivoted on the movable arc contact 22 at the second hinge axis H2.

Each second lever member 32 may be formed by a body of electrically insulating material having a blade configuration with opposite ends hinged to the arc contact 22 at the second axis H2 and to a corresponding first lever member 31 at the third axis H3, respectively.

In principle, the motion transmission mechanism 30 may be configured differently from the embodiment shown in FIGS. 1-3. As an example, the motion transmission mechanism may include a single lever member hinged to the support structure 90 and to the movable arc contact of the vacuum interrupter. As a further example, the motion transmission mechanism may include three or more mutually interacting lever members hinged to the support structure 90 and to the movable arc contact of the vacuum interrupter.

The mounting assembly 100 further includes an auxiliary contact 8 mechanically fixed to the support structure 90 and electrically connected to the first arc contact 21 of the vacuum interrupter 20.

The auxiliary contact 8 may be mechanically fixed to an outer surface (i.e., a surface oriented towards the surrounding environment) of the support structure 90 through suitable fixing means of known type, for example screws, rivets, shape-coupling or snap-fit arrangements (FIGS. 1-3).

According to some embodiments of the present disclosure (shown in the cited figures), the first fixed contact 21, to which the auxiliary contact 8 is electrically connected, is a fixed arc contact.

In this case, the auxiliary contact 8 is formed by a reversed-L shaped conductive body having a shorter leg mechanically fixed and electrically connected to the first arc contact 21 and a longer leg mechanically fixed to the support structure 90.

According to alternative embodiments of the present disclosure (not shown), the first fixed contact 21, to which the auxiliary contact 8 is electrically connected, is a movable arc contact. In this case, the auxiliary contact 8 is formed by an elongated conductive body (e.g., a lamina) having one end mechanically fixed to the support structure 90 and electrically connected to the first arc contact 21 through a flexible conductor and an opposite end mechanically fixed to the support structure 90.

As it is apparent from the above, the mounting assembly 100 forms a single body which can be installed as a whole in its final operating position. In practice, the mounting assembly 100 forms a self-standing module that can be directly assembled as if it were a single part of the switching apparatus.

This solution provides relevant advantages.

First of all, the mounting assembly 100 can be installed with similar operating modes independently on whether the switching apparatus is intended to be assembled as a self-standing product (FIGS. 5-6) or assembled in a cubicle (FIG. 7). The assembling process of the switching apparatus is thus greatly simplified. Additionally, the manufacturing time and costs of the switching apparatus can be remarkably reduced compared to traditional solutions.

The arrangement of the above-illustrated components (the support structure 90, the vacuum interrupter 20, the motion transmission mechanism 30 and the auxiliary contact 8) in a single mounting assembly allows achieving high levels of physical integration between said components, which results in a higher structural compactness and size reduction of the electric poles of the switching apparatus.

Additionally, since the mounting assembly 100 can be assembled in a dedicated manufacturing line, the mounting and the mutual positioning of the above-mentioned components is greatly simplified and can be carried out with higher accuracy compared to traditional assembly methods of the state of the art (in which the components are installed one by one). This results in higher quality and in more reliable operation of the final product.

Finally, the mounting assembly 100 can be suitably tested before its final installation. The identification of possible misalignments or other mounting defects is thus made easier and more effective.

According to the present disclosure, the assembling method includes the step of providing a first semi-finished structure 1A of the switching apparatus.

The first semi-finished structure 1A of the switching apparatus includes, for each electric pole of the switching apparatus, a first pole terminal 11, which is configured to be electrically connected to a corresponding conductor of an electric line, and a first fixed contact 5, which is electrically connected to the first pole terminal 11 (FIG. 4).

According to some embodiments of the present disclosure (FIGS. 4, 5 and 7), the first semi-finished structure also includes a ground terminal 13, which is configured to be electrically connected to a corresponding ground conductor, and a third fixed contact 7, which is electrically connected to the third pole terminal 13.

In principle, the fixed contacts 5, 7 and the pole terminals 11, 13 may be realized according to other solutions of known type, which are here not described in detail for the sake of brevity.

When the switching apparatus is intended to be assembled as a self-standing product (FIGS. 5-6), the first semi-finished structure 1A of the switching apparatus includes also a first housing shell 41 made of electrically insulating material. The first pole terminal 11, the first fixed contact 5 and, possibly, the third fixed contact 7 are conveniently fixed mechanically to the first housing shell 41.

For each electric pole, the first housing shell 41 may include a first bushing 43 protruding from a top region of said first housing shell (reference is made to a normal operating positioning of the switching apparatus like that one shown in FIGS. 5-6) and accommodating at least partially the first pole terminal 11.

In principle, the first housing shell 41 may be realized according to other solutions of known type, which are here not described in detail for the sake of brevity.

When the switching apparatus is intended to be assembled in a cubicle 500 (FIG. 7), the first semi-finished structure 1A of the switching apparatus may include a support bracket 55 made of electrically insulating material. The first pole terminal 11, the first fixed contact 5, the support bracket 55 and, possibly, the third fixed contact 7 are conveniently fixed mechanically to a supporting wall 50 of the cubicle 500. In these embodiments of the present disclosure, the first semi-finished structure 1A may not include housing shells.

According to the present disclosure, the assembling method includes the step of installing, for each electric pole of the switching apparatus, the mounting assembly 100 as a whole in the first semi-finished structure 1A of the switching apparatus.

In general, the installation of the mounting assembly 100 in the first semi-finished structure 1A includes the following steps:

- mechanically fixing the support structure 90 of the mounting assembly to one or more support components of the first semi-finished structure 1A;
- electrically connecting the second arc contact 22 of the vacuum interrupter 20 included in the mounting assembly to the first fixed contact 5 of the first semi-finished structure 1A.

When the switching apparatus is intended to be assembled as a self-standing product (FIGS. 5-6), the support structure 90 is mechanically fixed to the insulating housing shell 41 and to the first fixed contact 5 of the first semi-finished structure 1A.

When the switching apparatus is intended to be assembled in a cubicle 500 (FIG. 7), the support structure 90 is mechanically fixed to the supporting bracket 55 and the first fixed contact 5 of the first semi-finished structure 1A.

In both cases, the fixing of the support structure 90 may be conveniently carried out through suitable fixing means of known type, for example screws, rivets, shape-coupling or snap-fit arrangements (FIGS. 5-7).

In the embodiments of the present disclosure (shown in the cited figures), in which the first arc contact 21 and the second arc contacts 22 of the vacuum interrupter are respectively a fixed arc contact and a movable arc contact, the second arc contact 22 of the vacuum interrupter may be electrically connected to the first fixed contact 5 of the first semi-finished structure 1A through a flexible conductor or a sliding-contact arrangement.

In the embodiments of the present disclosure (not shown), in which the first arc contact 21 and the second arc contacts 22 of the vacuum interrupter are respectively a movable arc contact and a fixed arc contact, the second arc contact 22 of the vacuum interrupter may be electrically connected to the first fixed contact 5 of the first semi-finished structure 1A through a flexible conductor, a shape-coupling arrangement or suitable connection means, for example screws or rivets.

The mounting assembly 100 may be installed in the first semifinished structure 1A according to different orientations.

According to some embodiments of the present disclosure (FIGS. 5 and 7), the support structure 90 can be mechanically fixed to the above-mentioned at least one fixed support component 4, 5, 55, so that a main longitudinal axis of the vacuum chamber 23 of the vacuum interrupter 20 is transversal to a longitudinal vertical plane P1, along which the first pole terminals 11 of the first semi-finished structure 1A are arranged (reference is made to a normal operating positioning of the switching apparatus like that one shown in FIGS. 5-7).

According to other embodiments of the present disclosure (FIG. 6), the support structure 90 can be mechanically fixed to the above-mentioned at least one fixed support component 4, 5, 55, so that a main longitudinal axis of the vacuum chamber 23 of the vacuum interrupter 20 is parallel to or included in the longitudinal vertical plane P1. In this case, when the switching apparatus is intended to be assembled as a self-standing product, the mounting assembly 100 may be at least partially accommodated in a portion of internal volume defined by the first bushing 43 of the housing shell 41 of the first semi-finished structure.

The assembling method of the present disclosure may include the step of providing a second semi-finished structure 1B of the switching apparatus.

The second semi-finished structure 1B of the switching apparatus includes, for each electric pole of the switching apparatus, a second pole terminal 12, which is configured to be electrically connected to a corresponding conductor of an electric line, and a second fixed contact 6, which is electrically connected to the second pole terminal 12 (FIG. 4).

According to some embodiments of the present disclosure (FIG. 6), the second semi-finished structure 1B includes also a ground terminal 13, which is configured to be electrically connected to a corresponding ground conductor, and a third fixed contact 5, which is electrically connected to the ground pole terminal 7.

In principle, the fixed contacts 6, 7 and the pole terminals 12, 13 may be realized according to other solutions of known type, which are here not described in detail for the sake of brevity.

When the switching apparatus is intended to be assembled as a self-standing product (FIGS. 5-6), the second semi-finished structure 1B of the switching apparatus includes also a second housing shell 42 made of electrically insulating material. The second pole terminal 12, the second fixed contact 6 and, possibly, the third fixed contact 7 are conveniently fixed mechanically to the second housing shell 42.

For each electric pole, the second housing shell 42 may include a second bushing 44 protruding from a bottom region of said second housing shell (reference is made to a normal operating positioning of the switching apparatus like that one shown in FIGS. 5-7) and accommodating at least partially the second pole terminal 12.

In principle, the second housing shell 42 may be realized according to other solutions of known type, which are here not described in detail for the sake of brevity.

When the switching apparatus is intended to be assembled in a cubicle 500 (FIG. 7), the second pole terminal 12, the second fixed contact 6 and, possibly, the third fixed contact 7 are conveniently fixed mechanically to a supporting wall 50 of the cubicle 500. In these embodiments of the present disclosure, the second semi-finished structure 1B may not include housing shells.

The assembling method of the present disclosure may include the step of providing a third semi-finished structure 1C of the switching apparatus.

The third semi-finished structure 1C includes, for each electric pole of the switching apparatus, a movable contact 10 reversibly movable about a rotation axis according to opposite first and second rotation directions.

The third semi-finished structure 1C further includes a driving shaft 70 mechanically coupled to the movable contact 10 in such a way to be capable of driving these latter during the operation of the switching apparatus.

Conveniently, the driving shaft 70 is configured to be mechanically coupled to a suitable actuation assembly (not shown).

In principle, the movable contact 10 and the driving shaft 70 may be realized according to other solutions of known type, which are here not described in detail for the sake of brevity.

The assembling method of the present disclosure may include the step of assembling the second and third semi-finished structures 1B, 1C with the group formed by the first semi-finished structure 1A and the mounting assembly 100 in such a way to obtain the switching apparatus 1.

When the switching apparatus is intended to be assembled as a self-standing product (FIGS. 5-6), the assembling method of the present disclosure may include the step of filling the internal volume of the switching apparatus with an insulating gas.

FIGS. 5-7 show some embodiments of the switching apparatus 1 obtained with the assembly method of the present disclosure.

According to the embodiments in which it forms a self-standing product (FIGS. 5 and 6), the switching apparatus 1 includes an insulating housing 4. This latter may have an elongated shape (e.g., substantially cylindrical) developing along a main longitudinal axis. The electric poles of the switching apparatus are arranged side by side along corresponding transversal planes perpendicular the main longitudinal axis of the switching apparatus.

The insulating housing 4 is formed by the first housing shell 41 and the second housing shell 42 that are mutually joined along suitable coupling edges, when the first and second semi-finished structures 1A, 1B are assembled.

For each electric pole, the insulating housing 4 includes a first bushing 43 protruding from a top region of the first housing shell 41 and a second bushing 44 protruding from a bottom region of the second housing shell 42 (reference is made to a normal operating positioning of the switching apparatus like that one shown in FIGS. 5-6).

For each electric pole, the switching apparatus 1 includes the first pole terminal 11, the second pole terminal 12 and the ground terminal 13.

The first pole terminal 11 is configured to be electrically coupled to a first conductor of an electric line (e.g., a phase conductor electrically connected to an equivalent electric power source), the second pole terminal 12 is configured to be electrically connected to a second conductor of an electric line (e.g., a phase conductor electrically connected to an equivalent electric load) while the ground pole terminal 13 is configured to be electrically connected to a grounding conductor.

For each electric pole 2, the switching apparatus 1 includes a plurality of fixed contacts, which are spaced apart one from another and may be arranged around a main longitudinal axis of the switching apparatus.

For each electric pole, the switching apparatus 1 includes the first fixed contact 5, the second fixed contact 6, the third fixed contact 7 and the auxiliary contact 8 (which is included in the mounting assembly 100).

The first fixed contact 5 is electrically connected to the first pole terminal 11, the second fixed contact 6 is electrically connected to the second pole terminal 12, and the third fixed contact 7 is electrically connected to the ground pole terminal 13. The auxiliary contact 8 is instead electrically connected to the first arc contact 21 of the vacuum interrupter 20 as illustrated above.

For each electric pole, the switching apparatus 1 includes a movable contact 10 reversibly movable (along a given plane of rotation) about a corresponding a rotation axis, which is substantially parallel to or coinciding with the main longitudinal axis of the switching apparatus.

The movable contact 10 can rotate according to a first rotation direction, which is conveniently oriented away from the first fixed contact 5, or according to a second rotation direction, which is opposite to the first rotation direction and is oriented towards the first fixed contact 5.

As the movable contact 10 is reversibly movable about a rotation axis, the movable contact 6 can be coupled to or uncoupled from one or more of the fixed contacts 5, 6, 7, 8 thereby being electrically connected or electrically disconnected from these fixed contacts.

The switching apparatus 1 may include an actuation assembly (not shown) providing suitable actuation forces to actuate the movable contacts 10 of the electric poles.

Such an actuation assembly may be mechanically coupled to the motion transmission shaft 70 that can provide rotational mechanical forces to actuate the movable contacts 10 of the electric poles during the maneuvers of the switching apparatus.

In general, the actuation assembly of the switching apparatus may be realized according to solutions of known type. Therefore, in the following, it will be described only in relation to the aspects of interest of the present disclosure, for the sake of brevity.

For each electric pole, the switching apparatus 1 includes a vacuum interrupter 20, a motion transmission mechanism 30 and a support structure 90 configured to support these latter components and the auxiliary contact 8. All these components of the switching apparatus are part of the mounting assembly 100.

In operation, the switching apparatus 1 is capable of switching in three different operating states.

In particular, the switching apparatus 1 can switch in:

- a closed state, in which each electric pole 2 has the first and second pole terminals 11, 12 electrically connected one to another and electrically disconnected from the ground terminal 13. When the switching apparatus is in a closed state, a current can flow along each electric pole 2 between the corresponding first and second pole terminals 11, 12;
- an open state, in which each electric pole 2 has the first and second pole terminals 11, 12 and the ground terminal 13 electrically disconnected one from another. When the switching apparatus is in an open state, no currents can flow along the electric poles 2;
- a grounded state, in which each electric pole 2 has the first and second pole terminals 11, 12 electrically disconnected one from another and the second pole terminal 12 and the ground terminal 13 electrically connected one to another. When the switching apparatus is in a grounded state, no currents can flow along the electric poles 2. However, the second pole terminal 12 of each electric pole (and therefore the second line conductor connected thereto) is put at a ground voltage.

In the embodiments in which the switching apparatus is of the "single-disconnection" type (not shown), the movable contact 10 is coupled to the second fixed contact 6 and is decoupled from the remaining fixed contacts 5, 7, 8 of the electric pole, when the switching apparatus is in an open state.

In the embodiments in which the switching apparatus is of the "double-disconnection" type (FIGS. 5-7), the movable contact 10 is decoupled from any fixed contact 5, 6, 7, 8 of the electric pole, when the switching apparatus is in an open state.

In operation, the switching apparatus 1 is capable of carrying out different type of maneuvers, each corresponding to a transition among the above-mentioned operating states.

In particular, the switching apparatus 1 is capable of carrying out:

- an opening maneuver when it switches from a closed state to an open state;
- a closing maneuver when it switches from an open state to a closed state;
- a disconnecting maneuver when it switches from an open state to a grounded state;
- a reconnecting maneuver when it switches from a grounded state to an open state.

The switching apparatus 1 can switch from a closed state to a grounded state by carrying out an opening maneuver and subsequently a disconnecting maneuver while it can switch from a grounded state to a closed state by carrying out a reconnecting maneuver and subsequently a closing opening maneuver.

In order to carry out the above-mentioned maneuvers of the switching apparatus, the movable contact 10 of each electric pole is suitably driven according to the above-mentioned first rotation direction or second rotation direction.

In general, the operation of the switching apparatus 1 may occur according to known operating modes, which will be hereinafter not described in further detail for the sake of brevity.

As it is apparent from the above, the present disclosure relates also to the mounting assembly 100 provided when carrying out the assembling method of the present disclosure.

In a general definition, the mounting assembly 100 includes:

the support structure 90 made of electrically insulating material;

the vacuum interrupter 20, which includes the first arc contact 21, the second arc contact 22 and the vacuum chamber 23, in which the first and second arc contacts 21, 22 are at least partially enclosed and can be coupled or decoupled;

the motion transmission mechanism 30 mechanically coupled to a movable arc contact between the first and second arc contacts 21, 22 of the vacuum interrupter 20 and including at least a lever member 31 made of electrically insulating material pivoted on the support structure 90; and the auxiliary contact 8 mechanically fixed to the support structure 90 and electrically connected to the first arc contact 21 of the vacuum interrupter 20.

The mounting assembly 100 is configured to be installed on a first semi-finished structure 1A of the switching apparatus.

In particular, as explained above, when the mounting assembly 100 is installed in the switching apparatus:

the support structure 90 is mechanically fixed to one or more support components 5, 41, 55 of the first semi-finished structure 1A; and the second arc contact 22 of the vacuum interrupter 20 is electrically connected to a first fixed contact 5 of the first semi-finished structure 1A.

The assembling method, according to the present disclosure, provides remarkable advantages with respect to the known assembling methods of the state of the art.

The assembling method of the present disclosure allows installing in a simple and accurate manner (with very tight mechanical tolerances) some critical components of the switching apparatus, in particular the vacuum interrupter 20, the motion transmission mechanism 30 and the auxiliary contact 8.

The assembling method of the present disclosure can be employed in a very flexible manner, namely either when the switching apparatus is intended to be assembled as a self-standing product and when the switching apparatus is intended to be assembled in a cubicle.

As an example, the mounting assembly 100 may easily be adapted to include vacuum chambers 23 of different types. To this aim, it would be sufficient to employ a support structure 90 of different type without having to re-design the other components of the mounting assembly and, more generally, of the switching apparatus.

As a further example, a same mounting assembly 100 may be employed for assembling switching apparatuses of different types, for example load break switches, ring main units, outdoor disconnectors or switchgears, and the like.

The above-mentioned advantages of the assembling method of the present disclosure allows remarkably reducing the overall industrial costs of the switching apparatus as they allow exploiting relevant economies of scale in the manufacturing process.

The invention claimed is:

1. A method for assembling a switching apparatus for medium voltage electric systems, said switching apparatus comprising one or more electric poles, said method comprising:

for each electric pole of said switching apparatus, providing a mounting assembly, said mounting assembly comprising:

a support structure made of electrically insulating material;

a vacuum interrupter comprising a first arc contact, a second arc contact and a vacuum chamber, in which said first and second arc contacts are at least partially enclosed and can be coupled or decoupled;

a motion transmission mechanism mechanically coupled to a movable arc contact between said first and second arc contacts and including at least one lever member made of electrically insulating material pivoted on said support structure, wherein said motion transmission mechanism comprises at least one first lever member pivoted on said support structure at a first hinge axis and at least one second lever member pivoted on a movable arc contact between said first and second arc contacts at a second hinge axis; and an auxiliary contact mechanically fixed to said support structure and electrically connected to the first arc contact of said vacuum interrupter;

providing a first semi-finished structure of said switching apparatus, wherein said first semi-finished structure comprises, for each electric pole of said switching apparatus, a first pole terminal and a first fixed contact electrically connected to said first pole terminal; and for each electric pole of said switching apparatus, installing said mounting assembly on said first semi-finished structure of said switching apparatus, wherein the installation of said mounting assembly comprises:

mechanically fixing said support structure to one or more support components of said first semi-finished structure; and electrically connecting the second arc contact of said vacuum interrupter to the first fixed contact of said first semi-finished structure.

2. The method according to claim 1, wherein, for each electric pole of said switching apparatus, said support structure is mechanically fixed to a first housing shell of said first semi-finished structure and to said first fixed contact.

3. The method according to claim 1, wherein, for each electric pole of said switching apparatus, said support structure is mechanically fixed to a supporting bracket of said first semi-finished structure and to said first fixed contact.

4. The method according to claim 1, wherein said support structure is configured to define a seat, in which said vacuum chamber is accommodated.

5. The method according to claim 1, wherein said support structure comprises a first half-portion and a second half-portion mechanically fixed one to another.

6. The method according to claim 1, wherein each first lever member and each corresponding second lever member are pivoted one on another at a third hinge axis.

7. The method according to claim 1, wherein said first arc contact is a fixed arc contact and said second arc contact is a movable arc contact.

8. The method according to claim 1, wherein said first arc contact is a movable arc contact and said second arc contact is a fixed arc contact.

9. The method according to claim 1 further comprising providing a second semi-finished structure of said switching apparatus, wherein said second semi-finished structure comprises, for each electric pole of said switching apparatus, a second pole terminal and a second fixed contact electrically connected to said second pole terminal.

10. The method according to claim 9, wherein said first semi-finished structure or said second semi-finished structure comprises a ground terminal and a third fixed contact electrically connected to said ground terminal.

11. The method according to claim 9 further comprising providing a third semi-finished structure of said switching apparatus, wherein said third semi-finished structure comprises, for each electric pole of said switching apparatus, a movable contact reversibly movable about a rotation axis according to opposite first and second rotation directions, and a driving shaft mechanically coupled to each movable contact.

12. The method according to claim 11 further comprising assembling said second and third semi-finished structures with a group formed by said first semi-finished structure and said mounting assembly.

13. A mounting assembly for a medium voltage switching apparatus, said medium voltage switching apparatus comprising one or more electric poles, wherein said mounting assembly comprises:

a support structure made of electrically insulating material;

a vacuum interrupter comprising a first arc contact, a second arc contact and a vacuum chamber, in which said first and second arc contacts are at least partially enclosed and can be coupled or decoupled;

a motion transmission mechanism mechanically coupled to a movable arc contact between said first and second arc contacts and including at least one lever member made of electrically insulating material pivoted on said support structure, wherein said motion transmission mechanism comprises at least one first lever member pivoted on said support structure at a first hinge axis and at least one second lever member pivoted on a movable arc contact between said first and second arc contacts at a second hinge axis; and an auxiliary contact mechanically fixed to said support structure and electrically connected to the first arc contact of said vacuum interrupter, wherein said mounting assembly is configured to be installed on a first semi-finished structure of said medium voltage switching apparatus, wherein said support structure is configured to be mechanically fixed to one or more support components of said first semi-finished structure, and wherein the second arc contact of said vacuum interrupter is configured to be electrically connected to a first fixed contact of said first semi-finished structure.

14. A switching apparatus for medium voltage electric systems wherein said switching apparatus comprises, for each electric pole, the mounting assembly according to claim 13.

15. The switching apparatus according to claim 14, wherein said switching apparatus is a load-break switch for medium voltage electric systems.

* * * * *